No. 832,893. PATENTED OCT. 9, 1906.
R. CARTER.
GATE.
APPLICATION FILED FEB. 2, 1906.
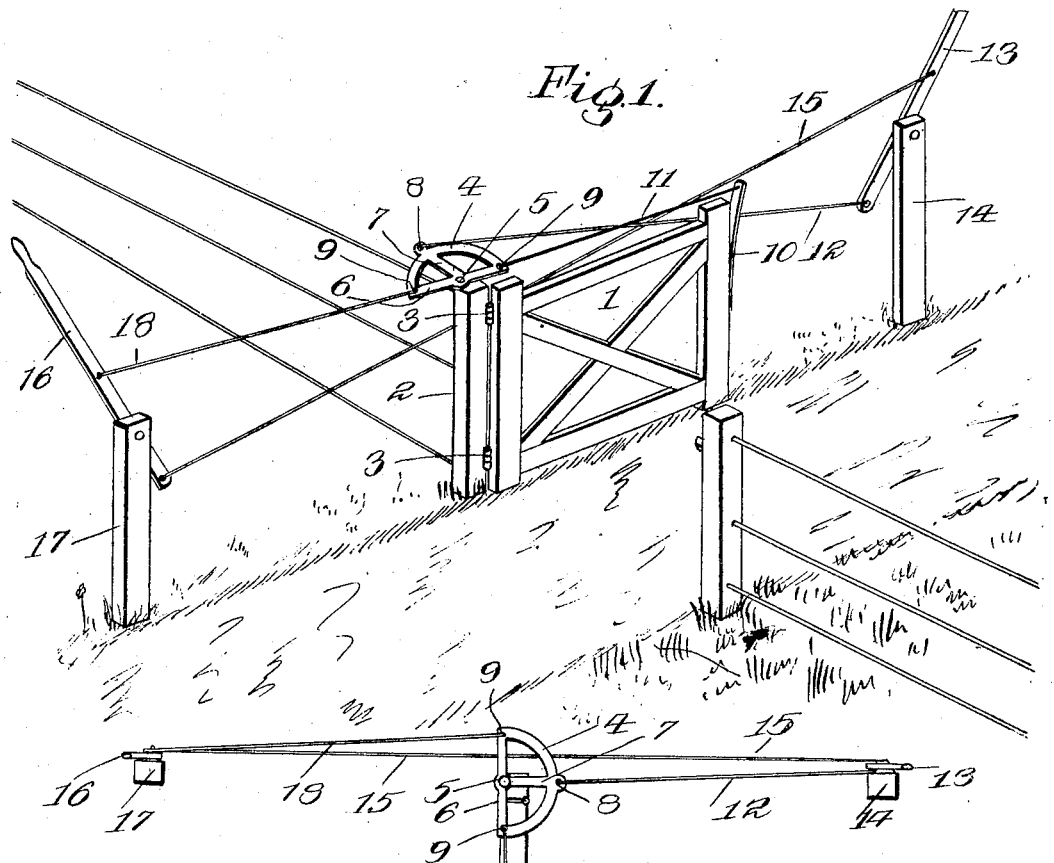
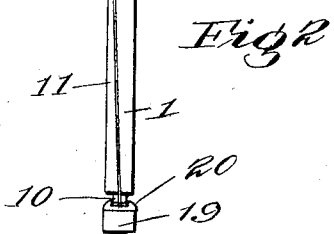
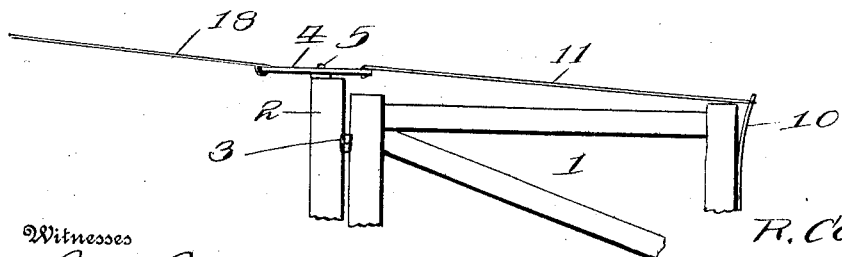
Witnesses
Inventor
R. Carter,
By Lacey, Attorneys

UNITED STATES PATENT OFFICE.

RICHARD CARTER, OF STANTON, NEW JERSEY.

GATE.

No. 832,893.     Specification of Letters Patent.     Patented Oct. 9, 1906.

Application filed February 2, 1906. Serial No. 299,208.

*To all whom it may concern:*

Be it known that I, RICHARD CARTER, a citizen of the United States, residing at Stanton, in the county of Hunterdon and State of New Jersey, have invented certain new and useful Improvements in Gates, of which the following is a specification.

The object of my invention is to provide an improved construction of farm-gate which will embody few and simple parts that can be cheaply manufactured and easily assembled, which will be durable in construction and efficient in operation, and which will be partially automatic in its operation in both opening and closing movements.

With this and other objects in view, as will more fully appear as the description proceeds, the invention consists in certain constructions, arrangements, and combinations of the parts hereinafter fully described, and specifically set forth in the appended claims.

For a full description of the invention and the merits thereof and also to acquire a knowledge of the details of construction of the means for effecting the result reference is to be had to the following description and accompanying drawings, in which—

Figure 1 is a perspective view of a gate embodying the improvements of my invention, the gate being shown in open position along the roadway. Fig. 2 is a top plan view thereof with the gate in the closed position. Fig. 3 is a side elevation of the upper portion of the gate.

Corresponding and like parts are referred to in the following description and indicated in all views of the drawings by the same reference characters.

Referring to the drawings, the numeral 1 designates a gate, the framework of which may be of any desired construction or design, and 2 designates the supporting-post to which the gate is hinged by means of hinges 3 of any desired character, preferably at one corner edge of the post, as best seen in Fig. 1 To the top of the post 2, and preferably at the diagonally opposite corner of the top, there is pivoted an actuating-plate 4. The said plate is mounted to turn about its pivot 5 in a horizontal plane. The actuating-plate 4 in the present instance consists of a semicircular structure, the base portion 6 of which is a straight cross-bar containing a pivot at its middle and provided with a right-angular arm 7 at the said middle portion, the end of said arm containing an eye 8 and being connected to the end of the base or cross-arm 6 by curved members, as best seen in Figs. 1 and 2.

To the free end of the gate 1, and preferably to the outermost edge thereof, a leaf or plate spring 10 is secured at its lower end. The spring 10 extends vertically in line with the gate with its free end projecting above the top of the gate a short distance and having an aperture in said free end, in which is secured one end of a guy-cable 11. The other end of said cable 11 is secured to the plate 4, preferably by being inserted through the adjacent aperture 9 therein. To the eye 8 of the actuating-plate 4, which, as shown, is preferably at about an angle of ninety degrees to the aperture 9, there is secured one end of an actuating-cable 12. The other end of this cable is secured to the lower end of a pivoted hand-lever 13, fulcrumed intermediate of its ends on a post 14, located at any desired distance from the supporting-post 2 of the gate, and preferably located at a convenient point along the roadway, so that persons approaching the gate may actuate said lever without alighting from the vehicle in which they are riding. A connecting-cable 15 is secured at one end to the hand-lever 13 on the opposite sides of its pivot or fulcrum, and said cable 15 is also connected to a corresponding hand-lever 16, fulcrumed intermediate its ends on a corresponding post 17 at any desired distance from the gate and on the opposite side thereof. The cable 15 is secured to the lever 16 below its fulcrum. Both levers 13 and 16 preferably, though not necessarily so, are pivoted so as to rock in a vertical plane. To the end of the hand-lever 16, above the fulcrum thereof, there is secured one end of another actuating-cable 18, said cable being also connected in the other aperture of the actuating-plate 4. As shown best in Fig. 2, a jam-post 19 may be provided with a keeper 20, having a central socket and beveled edges leading thereto, and the spring 10 may automatically seat itself in said keeper to maintain the gate in the closed position illustrated in said view.

In the practical operation of my improved gate for the purposes of description let it be assumed that the gate is in the open position shown in Fig. 1 and that it is desired to close the same after having passed the gate. To close the gate, it is only necessary to move the hand-lever 13 in a direction to pull upon the actuating-cable 12. The gate is held open secured against accidental swinging to the closed position by means of the guy-cable 11 and the spring 10, which, as is manifest, has a tension on the gate along the line beyond the center thereof when the gate is in the position shown in said figure. The movement of the hand-lever 13, however, through the instrumentality of the actuating-cable 12 will turn the actuating-plate 4 about its pivot 5 as a center and move the guy-cable 11 across the plane of the gate, whereupon the guy-cable and the spring 10 will exert a tension on the gate in a direction to automatically close the same and the gate will swing to the closed position. It will be held in such position, as it was formerly held in the open position, by means of the tension of the cable 11 and spring 10 drawing along the line indicated in Fig. 2; but, if desired, the keeper 20 may be employed to coact with the spring 10 as a latch. It is to be understood, however, that my invention is not limited to the coaction of the spring 10 with the keeper 20, as the gate may under certain conditions remain closed without the employment of a latching means. To open the gate, the reverse movement of the actuating-plate is effected, this being accomplished by the manipulation of either of the hand-levers 13 or 16, because, as noted, the two hand-levers are connected together at opposite sides of their fulcra, so that they will work simultaneously in opposite directions. If the hand-lever 16, for instance, be drawn upon with the parts in the closed position, (illustrated in Fig. 2,) it is evident that such movement will turn the actuating-plate 4 sufficiently to carry the guy-cable 11 to the opposite side of the center of the hinges and thereupon automatically swing the gate to open position. Hence it will be seen that both the open and closing movements of the gate are partially automatic, as it is only necessary to throw the point to which the cable 11 is connected to actuate the plate 4 to one side or the other of the hinge of the gate as a center by moving said point around the pivot 5 as a center.

The actuating-plate 4, it will be seen, is pivoted to the gate-post 2 back of and to one side of the point where the gate 1 is hinged. From the foregoing description, therefore, it will be seen that the tension device constituted by the spring 10, the cable 11, and the actuating-plate 4 will have a tendency to automatically swing the gate in one direction or the other, depending upon which side of a line drawn through the pivot-point of the gate and the pivot-point of the actuating-plate 4 the gate and tension device happen to be. In other words, when the gate is in the position shown in Fig. 2 the tension device exerts a pull upon the free end of the gate toward the pivot-point 5 of the actuating-point 4 on one side of the line drawn through said pivot-point and the point where the gate is hinged. Now when the actuating-plate 4 is turned it will tend to positively swing the gate until the free end of the gate and subsequently the tension device constituted by the spring 10, cable 11, and portion of the actuating-plate 4 arrive in line with the imaginary line drawn between the pivot 5 and the pivot-point of the gate, and as soon as they pass such imaginary line and move to the other side of said line it is evident that the tension means will automatically swing the gate to open position without any further pull upon the actuating-plate. Hence it will be seen that my improved gate is partially automatic in its movement in both directions.

It is to be noted, as best seen in Fig. 3, that the guy-cable 11 will act as a means to prevent the sagging of the gate and will always assist in maintaining the gate in its true level position.

Having thus described the invention, what is claimed as new is—

1. The combination of a support, a gate hinged thereto, a tension device secured to the gate and pivoted to a point on the support back of and to one side of the point at which the gate is hinged, and exerting a pressure toward said pivot-point from the free end of the gate, and means for moving said tension device to one side or the other of an imaginary line struck through the point at which the gate is hinged and the point at which the tension device is pivoted on the support, whereby the gate will automatically swing in one direction or the other when the tension device is moved to one side or the other of said line.

2. The combination of a supporting-post, a gate hinged thereto, an actuating-plate pivotally supported on said post back of the gate and at a point to one side of the point at which the gate is hinged, a spring connected to the free end of the gate, a tension-cable connected to said spring and secured under tension to the actuating-plate, and means for turning said plate to move the free end of the gate with its spring and the tension-cable and that portion of the actuating-plate between the point of attachment thereto to the tension-cable, and the pivotal point of the actuating-plate, to one side or the other of an imaginary line drawn between the pivotal point of the actuating-plate and the point at which the gate is hinged, as and for the purpose set forth.

3. The combination of a supporting-post, a gate hinged at one edge to said post, a plate-spring secured to the free edge of said gate and extending vertically above the same, an actuating-plate hinged to the top of said post at the rear of the hinges to which the gate is secured, a cable connected at one end to said spring and at its other end to one end of the actuating-plate and arranged to be moved thereby to one side or the other of the hinges, hand-levers mounted at opposite sides of the gate, a cable connected to one of said levers and to the actuating-plate at a point substantially ninety degrees from the point to which the first-named cable is connected, and another cable secured at one end to the actuating-plate at a point about one hundred and eighty degrees from the point to which the first-named cable is connected, the last-named cable being also connected to the other hand-lever.

4. The combination of a supporting-post, a gate hinged at one edge to said post, a plate-spring secured to the free edge of said gate and extending vertically above the same, an actuating-plate hinged to the top of said post at the rear of the hinges to which the gate is secured, a cable connected at one end to said spring and at its other end to one end of the actuating-plate and arranged to be moved thereby to one side or the other of the hinges, hand-levers mounted at opposite sides of the gate, a cable connected to one of said levers and to the actuating-plate at a point substantially ninety degrees from the point to which the first-named cable is connected, another cable secured at one end to the actuating-plate at a point about one hundred and eighty degrees from the point to which the first-named cable is connected, the last-named cable being also connected to the other hand-lever, and a cable connecting the hand-levers together at opposite sides of their fulcra.

In testimony whereof I affix my signature in presence of two witnesses.

RICHARD CARTER. [L. S.]

Witnesses:
    J. D. YOAKLEY,
    F. H. JOHNSTON.